US011934128B2

(12) United States Patent
Sugimoto et al.

(10) Patent No.: US 11,934,128 B2
(45) Date of Patent: Mar. 19, 2024

(54) FIXING BELT HAVING INCREASED SURFACE ROUGHNESS

(71) Applicant: CANON KABUSHIKI KAISHA, Tokyo (JP)

(72) Inventors: Hiroto Sugimoto, Ibaraki (JP); Naoki Akiyama, Ibaraki (JP); Yasuhiro Miyahara, Tokyo (JP); Noriaki Kobayashi, Ibaraki (JP); Hiroki Muramatsu, Tokyo (JP); Akeshi Asaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/869,642

(22) Filed: Jul. 20, 2022

(65) Prior Publication Data

US 2023/0031844 A1 Feb. 2, 2023

(30) Foreign Application Priority Data

Jul. 28, 2021 (JP) ................................ 2021-123506

(51) Int. Cl.
*G03G 15/20* (2006.01)

(52) U.S. Cl.
CPC ..... *G03G 15/2057* (2013.01); *G03G 15/2017* (2013.01); *G03G 15/2053* (2013.01); *G03G 2215/2003* (2013.01); *G03G 2215/2016* (2013.01); *G03G 2215/2048* (2013.01); *G03G 2215/2051* (2013.01); *G03G 2215/2054* (2013.01)

(58) Field of Classification Search
CPC .......... G03G 15/2017; G03G 15/2053; G03G 15/2057; G03G 2215/2003; G03G 2215/2016; G03G 2215/2048; G03G 2215/2051; G03G 2215/2054
See application file for complete search history.

(56) References Cited

U.S. PATENT DOCUMENTS

2014/0348559 A1* 11/2014 Miyahara .................. B32B 7/00 399/329

FOREIGN PATENT DOCUMENTS

| | | | |
|---|---|---|---|
| JP | S63313182 | A | 12/1988 |
| JP | H02157878 | A | 6/1990 |
| JP | 2014228729 | A | 12/2014 |

* cited by examiner

*Primary Examiner* — Joseph S Wong
(74) *Attorney, Agent, or Firm* — Canon U.S.A., Inc. I.P. Division

(57) ABSTRACT

A fixing belt includes a base member containing a metal, a sliding layer containing a filler and formed on a base member inner side, and a separation layer formed on a base member outer side. Assume that (i) a sliding layer cross section is obtained by cutting the sliding layer along a sliding layer thickness direction and is divided into sections each having a length that is the same as a sliding layer thickness in a direction perpendicular to the thickness direction, and (ii) a ratio of a filler area to a sliding layer area in each cross section sections is an area ratio. A period coefficient is calculated using the formula (Ave %−Min %)/Ave %, where an average of area ratios of filler areas in all the sections is Ave % and a minimum of the area ratios is Min %, and the calculated period coefficient is 0.6 or more.

14 Claims, 11 Drawing Sheets

CROSS SECTION OF INNER SURFACE SLIDING LAYER 1b
ACCORDING TO EXEMPLARY EMBODIMENT

CROSS SECTION OF INNER SURFACE SLIDING LAYER 1b
ACCORDING TO COMPARATIVE EXAMPLE

| SECTION NUMBER | AREA RATIO % |
|---|---|
| 1 | 17.458 |
| 2 | 20.753 |
| 3 | 24.561 |
| 4 | 14.976 |
| 5 | 7.916 |
| 6 | 11.04 |
| 7 | 9.114 |
| 8 | 5.777 |
| 9 | 7.745 |
| 10 | 3.979 |
| 11 | 5.006 |
| 12 | 19.469 |
| 13 | 23.192 |
| 14 | 20.539 |
| 15 | 29.996 |
| 16 | 36.243 |
| 17 | 26.016 |
| 18 | 26.059 |
| 19 | 27.728 |
| 20 | 19.769 |
| 21 | 18.999 |

Ave% 17.9
Min% 4.0
PERIOD COEFFICIENT 0.78

Present Exemplary Embodiment
Fluorine phlogopite serving as the scale-like filler 1a having an aspect ratio of 50 (an average particle diameter of 6 μm and a particle thickness of 100 nm).

| SECTION NUMBER | AREA RATIO % |
|---|---|
| 1 | 14.608 |
| 2 | 19.314 |
| 3 | 18.039 |
| 4 | 18.529 |
| 5 | 14.314 |
| 6 | 16.078 |
| 7 | 14.902 |
| 8 | 14.706 |
| 9 | 16.569 |
| 10 | 23.235 |
| 11 | 20.196 |
| 12 | 16.078 |
| 13 | 17.255 |
| 14 | 18.039 |
| 15 | 15.294 |
| 16 | 15.294 |
| 17 | 13.725 |
| 18 | 12.157 |
| 19 | 12.353 |
| 20 | 9.706 |
| 21 | 6.863 |

Ave% 15.6
Min% 6.9
PERIOD COEFFICIENT 0.56

Comparative Example

Fluorine phlogopite serving as the scale-like filler 1a having an aspect ratio of 80 (an average particle diameter of 8 μm and a particle thickness of 100 nm).

FIG.9

| | FILLER | LASIN LAYER THICKNESS (μm) | PERIOD COEFFICIENT A | INNER CIRCUMFERENTIAL SURFACE ROUGHNESS Ra (μm) |
|---|---|---|---|---|
| EXEMPLARY EMBODIMENT | MICA A ASPECT RATIO: 50 AVERAGE PARTICLE DIAMETER: 6 μm | 16.286 | 0.75 | 0.46 |
| COMPARATIVE EXAMPLE | MICA B ASPECT RATIO: 80 AVERAGE PARTICLE DIAMETER: 8 μm | 15.575 | 0.56 | 0.29 |

FIXING BELT HAVING INCREASED SURFACE ROUGHNESS

BACKGROUND

Field

The present disclosure relates to a fixing belt used in an image forming apparatus using an electrophotographic method.

Description of the Related Art

In recent years, an on-demand method has been known as a method used in a fixing device for an electrophotographic apparatus. The on-demand method exhibits high heat-transfer efficiency and enables fast start-up of the device. The on-demand method is applied to a fixing device using a belt heating method in which toner on transfer paper is heated by heat from a heater via a fixing belt with a small capacity.

In such a belt type fixing device, a fixedly supported heating member is used as discussed in each of Japanese Patent Application Laid-Open No. S63-313182 and Japanese Patent Application Laid-Open No. H02-157878. For example, a ceramic heater is used as the heating member. The belt type fixing device further includes a fixing belt as a heat transfer member that slides with the heating member, and an elastic pressure roller as a pressure member that is in pressure contact with the heating member via the fixing belt to form a fixing nip portion. At the fixing nip portion, the fixing belt and the elastic pressure roller nip and convey a recording material that bears an unfixed toner image thereon to apply heat and pressure to the recording material. Accordingly, the unfixed toner image is fixed onto the recording material.

A basic configuration of a conventional fixing belt includes at least a thin-wall cylindrical base member having a small heat capacity, an elastic layer, and a separation layer. In a case where the cylindrical base member is made of a heat resistance resin, an inner circumferential surface of the cylindrical base member serves as a sliding layer sliding with the heating member. In a case where the cylindrical base member contains a metal, the fixing belt includes a sliding layer made of a heat resistance resin to maintain slidability with the heating member. In this case, the fixing belt is configured to arrange the sliding layer, the cylindrical base member, the silicone rubber elastic layer, and the fluororesin separation layer in order from the inner layer to the outer layer.

The belt-type fixing device includes the fixedly supported heating member inside the fixing belt, and uses a method of nipping and conveying the fixing belt and the recording material between the heating member and the elastic pressure roller to fix the toner image onto the recording material. Thus, friction and wear occur between the inner circumferential surface of the fixing belt and the fixedly supported heating member. As a result, through use over time, self-excited vibration called stick slip or torque-up may occur in some cases.

Some conventional fixing belts employ a method of blending a needle-shaped (whisker-shaped or fiber-shaped) filler into an inner surface sliding layer of a fixing belt to increase an orientation rate of the filler in a longitudinal direction (a rotation axis direction) of the fixing belt, thereby increasing slidability, wear resistance, and lubricant retention to achieve prolonged life.

However, in a case where a needle-shaped (whisker-shaped or fiber-shaped) filler having shape anisotropy is oriented in the longitudinal direction, it is difficult to provide wear resistance strength in a belt rotation direction (a circumferential direction) which is a main sliding direction.

Furthermore, in such a case, it is necessary to form surface roughness to reduce a contact area between the fixing belt and a back-up member and retain a lubricant interposed between the fixing belt and the back-up member. It is difficult to achieve desired surface roughness with a small blending amount of the filler. If the blending amount of the filler is increased too much to obtain the desired surface roughness, the wear resistance strength of the sliding layer is rather impaired.

SUMMARY

The present disclosure is directed to a fixing belt that achieves desired surface roughness with a small blending amount of filler, thereby increasing wear resistance to prolong durable life.

According to an aspect of the present disclosure, a fixing belt includes a base member having a cylindrical shape and containing a metal, a sliding layer formed on an inner circumferential surface side of the base member and containing a filler, and a separation layer formed on an outer circumferential surface side of the base member, wherein, assume that (i) a cross section of the sliding layer is obtained by cutting the sliding layer along a thickness direction of the sliding layer serving as a vertical axis and is divided into a plurality of sections each having a length whose value is the same as a value of a thickness of the sliding layer in a direction perpendicular to the thickness direction, and (ii) a ratio of an area of the filler to an area of the sliding layer in each of the plurality of sections of the cross section is an area ratio, wherein a period coefficient is calculated using the formula (Ave %−Min %)/Ave %, where an average of area ratios of areas of the filler in all sections of the plurality of sections is Ave % and a minimum of the area ratios is Min %, and wherein a value of the calculated period coefficient is 0.6 or more.

Further features of the present disclosure will become apparent from the following description of exemplary embodiments with reference to the attached drawings.

BRIEF DESCRIPTION OF THE DRAWINGS

FIG. 9 is a table illustrating a comparison in film thickness, period coefficient, and inner circumferential surface roughness between the present exemplary embodiment and the comparative example.

DESCRIPTION OF THE EMBODIMENTS

An exemplary embodiment of the present disclosure will be described in detail below with reference to the drawings. The scope of the present disclosure is not limited to the exemplary embodiment, and the exemplary embodiment can be modified without departing from the gist of the present disclosure and such modifications of the exemplary embodiment are included in exemplary embodiments of the present disclosure.

(1) Overview of Configuration of Image Forming Apparatus

Figure 1:
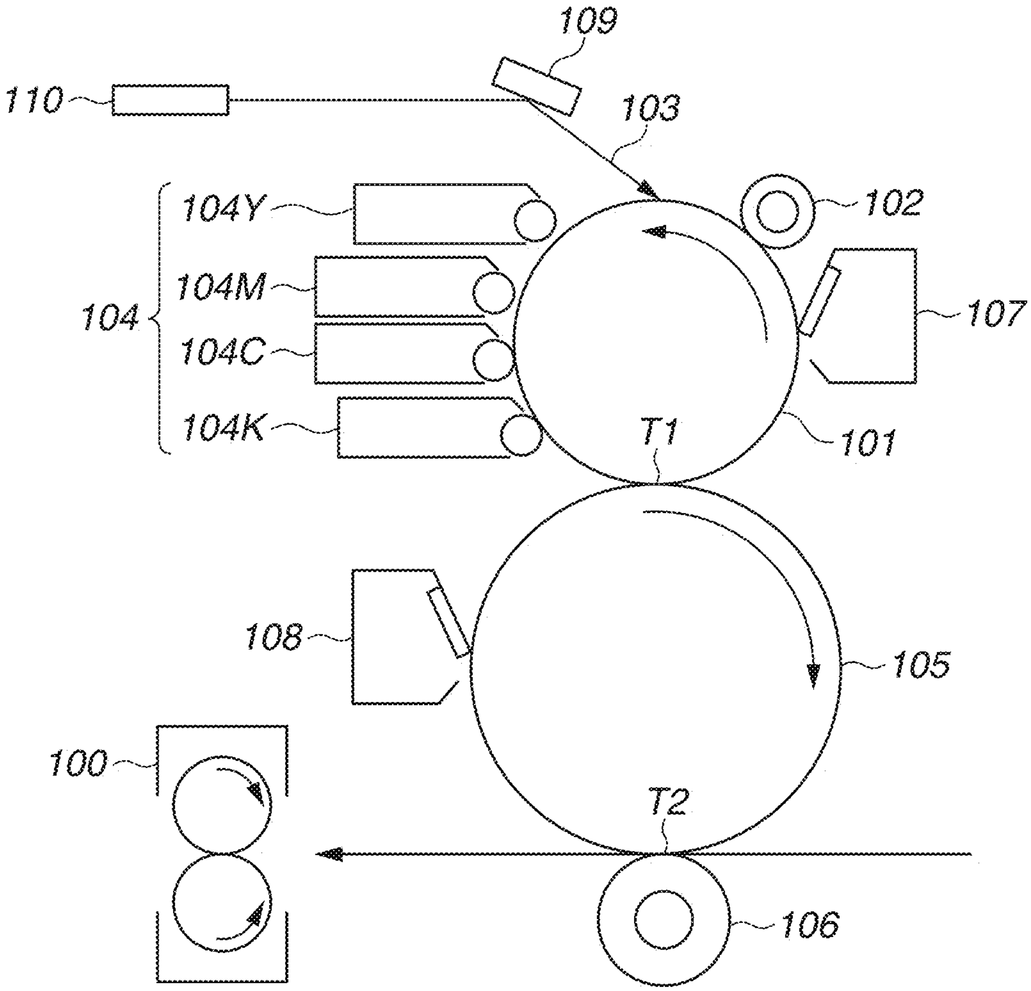
FIG. 1 is a cross-sectional view schematically illustrating an image forming apparatus according to an exemplary embodiment.

FIG. 1 is a cross-sectional view schematically illustrating an image forming apparatus according to the present exemplary embodiment. A photosensitive drum 101 serving as an image bearing member is driven to rotate at a predetermined process speed (circumferential speed) in a counterclockwise direction indicated by an arrow. Charging processing is performed on the photosensitive drum 101 by a charging device 102 such as a charging roller during the rotation, so that the photosensitive drum 101 is charged to a predetermined polarity.

Subsequently, exposure processing is performed on a surface, of the photosensitive drum 101, subjected to the charging processing, using laser light 103 output from a laser optical system 110 based on input image information. The laser optical system 110 outputs the laser light 103 that is modulated (on or off) based on time-series electric digital pixel signals of the target image information from an image signal generation device (not illustrated) such as an image reading device, and scans and exposes the surface of the photosensitive drum 101.

As a result of the scan and exposure, an electrostatic latent image corresponding to the image information is formed on the surface of the photosensitive drum 101. A mirror 109 deflects the laser light 103 output from the laser optical system 110 to an exposure position of the photosensitive drum 101. The electrostatic latent image formed on the photosensitive drum 101 is visualized with yellow toner by a yellow developing device 104Y among developing devices 104. The resulting yellow toner image is transferred to a surface of an intermediate transfer drum 105 at a primary transfer portion T1 that is a contact portion between the photosensitive drum 101 and the intermediate transfer drum 105.

Residual toner on the surface of the photosensitive drum 101 is cleaned by a cleaner 107. A cycle of the above-described charging, exposure, development, primary transfer, and cleaning processes is similarly repeated to form a magenta toner image (through operation of a developing device 104M), a cyan toner image (through operation of a developing device 104C), and a black toner image (through operation of a developing device 104K). In this manner, the respective color toner images sequentially superimposed on the intermediate transfer drum 105 are secondarily and collectively transferred onto a recording material P (refer to FIG. 2) at a secondary transfer portion T2 that is a contact portion between the intermediate transfer drum 105 and a transfer roller 106. Residual toner on the surface of the intermediate transfer drum 105 is cleaned by a cleaner 108.

The cleaner 108 is configured to come into contact with and separate from the intermediate transfer drum 105, and is in contact with the intermediate transfer drum 105 while the intermediate transfer drum 105 is cleaned. The transfer roller 106 is also configured to come into contact with and separate from the intermediate transfer drum 105, and is in contact with the intermediate transfer drum 105 during the secondary transfer. The recording material P, which has passed through the secondary transfer portion T2, is guided into a fixing device 100 serving as an image heating device, and is subjected to fixing processing (image heating processing) for fixing an unfixed toner image t (refer to FIG. 2) borne on the recording material P to the recording material P. The recording material P subjected to the fixing processing is discharged outside the image forming apparatus, so that a series of image forming processes is completed.

(2) Overview of Configuration of Fixing Device

Figure 2:
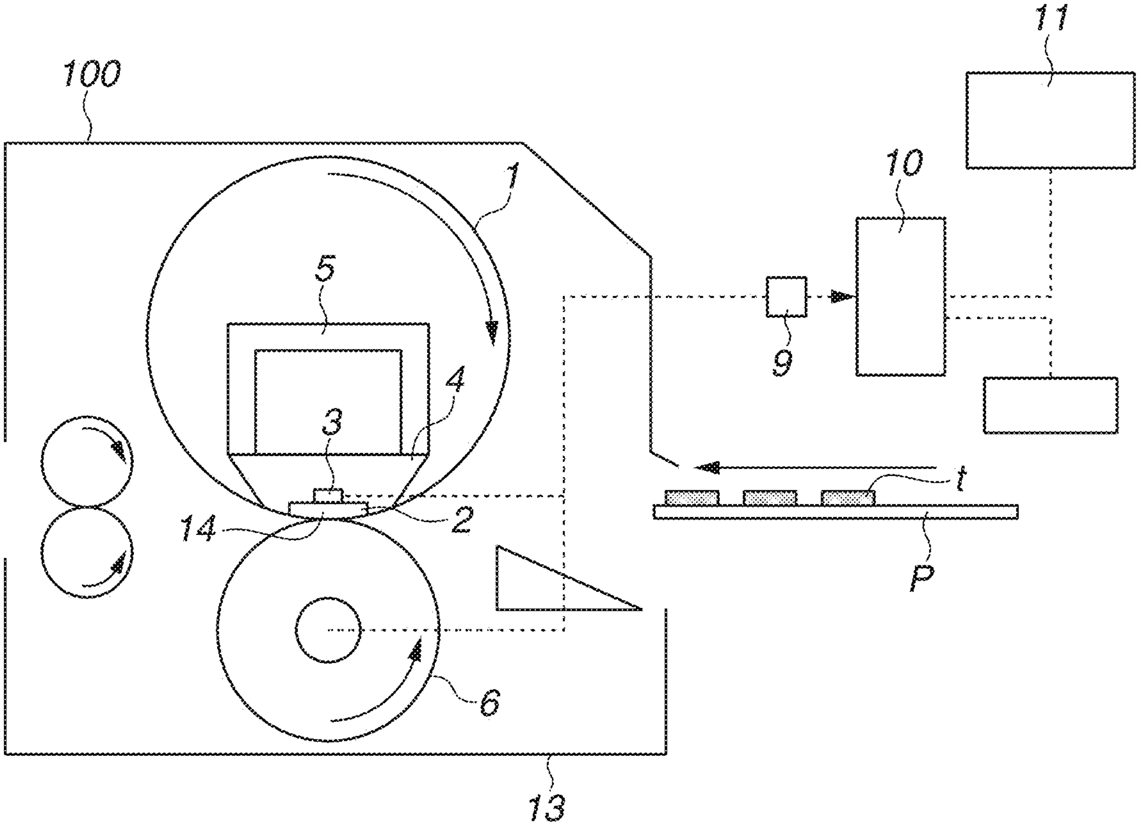
FIG. 2 is a cross-sectional view schematically illustrating a fixing device according to the present exemplary embodiment.

FIG. 2 is a cross-sectional view schematically illustrating the fixing device 100. A fixing belt (an endless belt) 1 has a cylindrical shape and includes an elastic layer. A pressure roller 6 serves as a pressure member that forms a fixing nip portion 14 with the fixing belt 1. A fixing heater 2 serves as a heating member. A film guide and heater holder 4 has heat resistance. The fixing heater 2 is fixed on a bottom surface of the film guide and heater holder 4 along a longitudinal direction of the film guide and heater holder 4, and has a configuration in which the fixing belt 1 and a heating surface of the fixing heater 2 are slidable.

The fixing belt 1 is externally fit on the film guide and heater holder 4 with a certain degree of freedom. The film guide and heater holder 4 is formed of a liquid crystal polymer resin having high heat resistance, and functions to hold the fixing heater 2 and form the fixing belt 1 into a shape that can be separated from the recording material P. The pressure roller 6 has a multi-layer structure in which a silicone rubber layer as an elastic layer with a thickness of about 3 mm and a perfluoroalkoxy alkanes (PFA) resin tube with a thickness of about 40 μm are laminated in this order on a stainless core metal. End portions of the core metal of the pressure roller 6 are rotatably held by bearings between side plates (not illustrated) on a rear side and a front side of a device frame 13. On an upper side of the pressure roller 6, a fixing unit including the fixing heater 2, the film guide and heater holder 4, a fixing belt stay 5, and the fixing belt 1 is disposed.

The fixing unit 1-2 and 4-5 is disposed in parallel to the pressure roller 6 with the fixing heater 2 side facing downward. Each end portion of the fixing belt stay 5 is urged toward the pressure roller 6 with a force of 156.8 N (16 kgf) by a pressing mechanism (not illustrated), i.e., the fixing belt stay 5 is urged toward the pressure roller 6 with a total of 313.6 N (32 kgf). Accordingly, a lower surface (the heating surface) of the fixing heater 2 is pressed against the elastic layer of the pressure roller 6 via the fixing belt 1 with a predetermined pressing force, and the fixing nip portion 14 having a predetermined width suitable for fixing is formed.

A thermistor 3 serves as a temperature detection unit. The thermistor 3 (a heater temperature sensor) is disposed on a back surface (a surface on a side opposite to the heating surface) of the fixing heater 2 serving as a heat source, and has a function of detecting a temperature of the fixing heater 2. The pressure roller 6 is driven to rotate at a predetermined circumferential speed in a direction indicated by an arrow. The fixing belt 1, which is in pressure contact with the pressure roller 6, is driven to rotate by the pressure roller 6 at a predetermined speed. At this time, the fixing belt 1 is in a state of being driven to rotate around an outer circumference of the film guide and heater holder 4 in a direction indicated by an arrow while an inner surface of the fixing belt 1 is in sliding contact with the lower surface of the fixing heater 2.

A semisolid lubricant (described below) is applied to the inner surface of the fixing belt 1, and provides slidability between the film guide and heater holder 4 and the inner surface of the fixing belt 1. The thermistor 3 is disposed in contact with the back surface of the fixing heater 2, and is connected to a control circuit unit (a control unit or a central processing unit (CPU)) 10 via an analog-to-digital (A/D) converter 9. The control circuit unit (the CPU) 10 is configured to sample output from the thermistor 3 at predetermined intervals, and reflect temperature information obtained by the sampling into temperature control. In other words, the control circuit unit (the CPU) 10 determines temperature control conditions for the fixing heater 2 based on the output from the thermistor 3, and controls energization of the fixing heater 2 using a heater driving circuit unit 11 serving as a power supply unit so that the temperature of the fixing heater 2 is a target temperature (a set temperature).

In addition, the control circuit unit (the CPU) 10 controls a sequence of estimating life of the fixing belt 1 (described below) and is connected to a driving motor (not illustrated) of the pressure roller 6 via the A/D converter 9. The fixing heater 2 includes an alumina substrate and a resistance heating element above the alumina substrate. A conductive paste containing silver and palladium is uniformly applied to the resistance heating element by using a screen print method so that a film thickness of the paste is about 10 μm. Furthermore, the fixing heater 2 is coated with pressure-resistant glass above the resistance heating element to serve as a ceramic heater.

(3) Overview of Configuration of Fixing Belt

Figure 3:
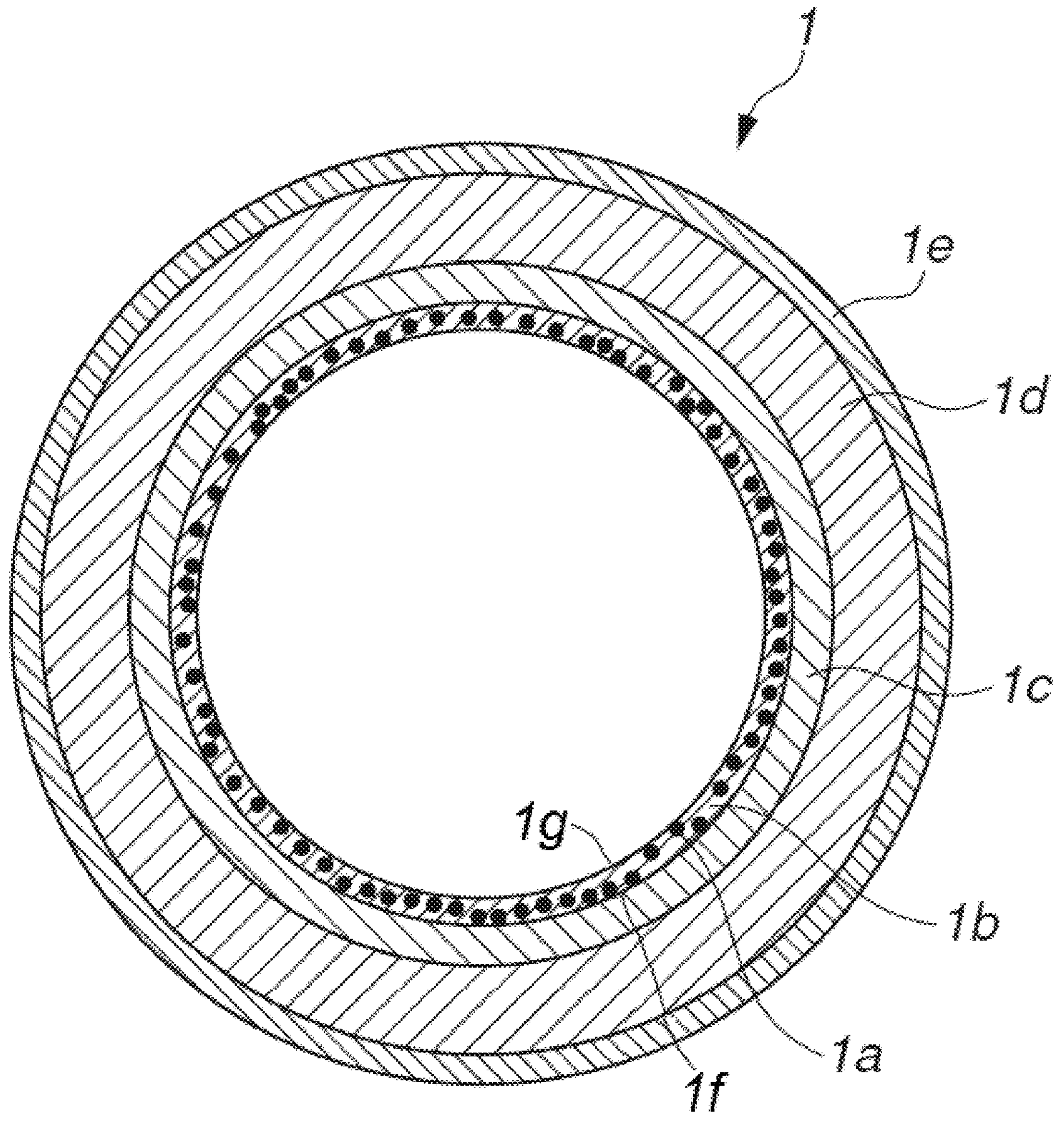
FIG. 3 is a schematic view of a fixing belt according to the present exemplary embodiment.

FIG. 3 is a schematic view of the fixing belt 1 according to the present exemplary embodiment. The fixing belt 1 includes a cylindrical base member 1*c*, an inner surface sliding layer 1*b* having an outer circumferential surface if disposed on an inner circumferential surface of the cylindrical base member 1*c* and having an inner circumferential surface 1*g* as a sliding surface side 1*g*, and a filler 1*a* blended into the inner surface sliding layer 1*b*. A silicone rubber elastic layer 1*d* covers an outer circumferential surface of the cylindrical base member 1*c*, and is disposed via a primer layer. A fluororesin separation layer 1*e* serves as a surface layer that covers an outer circumferential surface of the silicone rubber elastic layer 1*d*, and is disposed with a silicone rubber adhesive layer interposed between the fluororesin separation layer 1*e* and the silicone rubber elastic layer 1*d*.

A detailed configuration of the fixing belt 1 will be described next.

(3-1) Cylindrical Base Member 1*c*

A metal such as steel use stainless (SUS), nickel, or a nickel alloy is suitably used for the cylindrical base member 1*c* in light of heat resistance and bending resistance. The cylindrical base member 1*c* is to have higher mechanical strength while maintaining a smaller heat capacity, and thus a thickness thereof is desirably 20 to 50 μm, more desirably 25 to 45 μm. In the present exemplary embodiment, SUS with an inner diameter of 24 mm and a thickness of 30 μm is used as the cylindrical base member 1*c*.

(3-2) Inner Surface Sliding Layer 1*b*

A resin having both high durability and high heat resistance such as a polyimide resin is suitable for use as the inner surface sliding layer 1*b*. In the present exemplary embodiment, the inner surface sliding layer 1*b* is formed as follows. A polyimide precursor solution 23 (refer to FIG. 4), which is obtained by reaction of aromatic tetracarboxylic dianhydride or a derivative thereof and aromatic diamine in a substantially equimolar organic polar solvent and into which the filler 1*a* is dispersed to form a filler dispersion solution 24, is applied to the inner circumferential surface of the cylindrical base member 1*c*. After the solvent is dried, the solvent is heated to cause a dehydrative ring-closing reaction (an imidization reaction).

A thickness of the inner surface sliding layer 1*b* is desirably about 5 to 25 μm. Especially, the thickness of about 7 to 20 μm makes it easier to provide compatibility between wear resistance at the fixing nip portion 14 and heat conductivity for transferring heat from the fixing heater 2 to the cylindrical base member 1*c*.

(3-2-1) Polyimide Precursor Solution 23

Typical examples of the aromatic tetracarboxylic dianhydride include pyromellitic dianhydride, 3,3',4,4'-biphenyltetracarboxylic dianhydride, 3,3',4,4'-benzophenonetetracarboxylic dianhydride, and 2,3,6,7-naphthalenetetracarboxylic dianhydride. Each of these types of the aromatic tetracarboxylic dianhydride can be used independently or two or more types thereof can be used in combination.

Typical examples of the aromatic diamine include 4,4'-oxydianiline (4,4'-ODA), paraphenylenediamine (PPDA), and meta-phenylenediamine (MPDA). Each of these types of the aromatic diamine can be used independently or two or more types thereof can be used in combination.

Examples of the above-described organic polar solvent include N, N-dimethylacetamide (DMAc), dimethylformamide (DMF), and N-methyl-2-pyrrolidone (NMP).

(3-2-2) Filler 1*a*

The filler 1*a* can be blended into the inner surface sliding layer 1*b* in order to improve wear resistance. To improve wear resistance, a fluororesin such as polytetrafluoroethylene, molybdenum disulfide, graphite, or the like can be blended as the filler 1*a*. Any of these is appropriately selected based on a combination of sliding materials. Because the lubricant is used based on combination with a ceramic material as a sliding material in the present exemplary embodiment, the filler 1*a* to be blended is to have cleavage and appropriate hardness, and a mica material is suitable for use as the filler 1*a*.

Fluorine phlogopite ($KMg_3(AlSi_3)O_{10}F_2$), which is non-swelling synthetic mica, potassium four silicon mica ($KMg_{2.5}Si_4O_{10}F_2$), sodium four silicon mica ($NaMg_{2.5}Si_4O_{10}F_2$), which is swelling synthetic mica, sodium bentonite ($Na_{0.33}Mg_{2.67}Li_{0.33}Si_4O_{10}F_2$), silica ($SiO_2$) hexagonal boron nitride (BN), graphite, graphene, or the like can be used as the filler 1*a*.

Examples of a method for dispersing the filler 1*a* into the polyimide precursor solution 23 to form the filler dispersion solution 24 (refer to FIG. 5) includes (i) a method of directly adding the filler 1*a* in the polyimide precursor solution 23, preliminarily stirring the polyimide precursor solution 23 using a mixing device such as a mixer, and then dispersing the filler 1*a* into the polyimide precursor solution 23 using a three-roll mill or the like, and ii)_a method of preliminarily adding the filler 1*a* in a polar solvent (e.g., n-methyl-2-pyrrolidone (NMP)) similar to the polyimide precursor solution 23, using the filler 1_a_ in the polar solvent to prepare a filler-dispersing solvent using a sand mill or a bead mill, and then mixing the polyimide precursor solution 23 obtained separately and the filler-dispersing solvent using a mixing device such as a mixer.

An optimal blending amount of the filler 1_a_ depends on a type of the polyimide precursor solution 23 or a type of the filler 1_a_, but is desirably 7% by volume or more and 15% by volume or less with respect to a volume of the inner surface sliding layer 1_b_, which is a range that allows adjustment of surface roughness of the inner surface sliding layer 1_b_ in an appropriate range and that does not impair wear resistance strength of the inner surface sliding layer 1_b_.

In a case where the volume of the filler 1_a_ is less than 7% by volume, it is difficult to obtain the surface roughness for decreasing a true contact area with the mating sliding material and obtaining the retention of the intervening lubricant.

In a case where the volume of the filler 1_a_ is more than 15% by volume, the polyimide of the polyimide precursor solution 23 in the inner surface sliding layer 1_b_ becomes hard and brittle due to the filler 1_a_ blended into the polyimide precursor solution 23. As a result, the wear resistance strength of the inner surface sliding layer 1_b_ is impaired, and it is difficult to maintain appropriate surface roughness, i.e., slidability and lubricant retention of the inner surface sliding layer 1_b_ over the durable period.

(3-2-3) Formation of Inner Surface Sliding Layer 1_b_

To make the thickness of the inner surface sliding layer 1_b_ about 12 μm, the inner surface of the cylindrical base member 1_c_ is coated using a ring-coating method or the like so that a thickness of the polyimide precursor solution 23 blended with the filler 1_a_ is about 70 to 80 μm.

Figure 4:
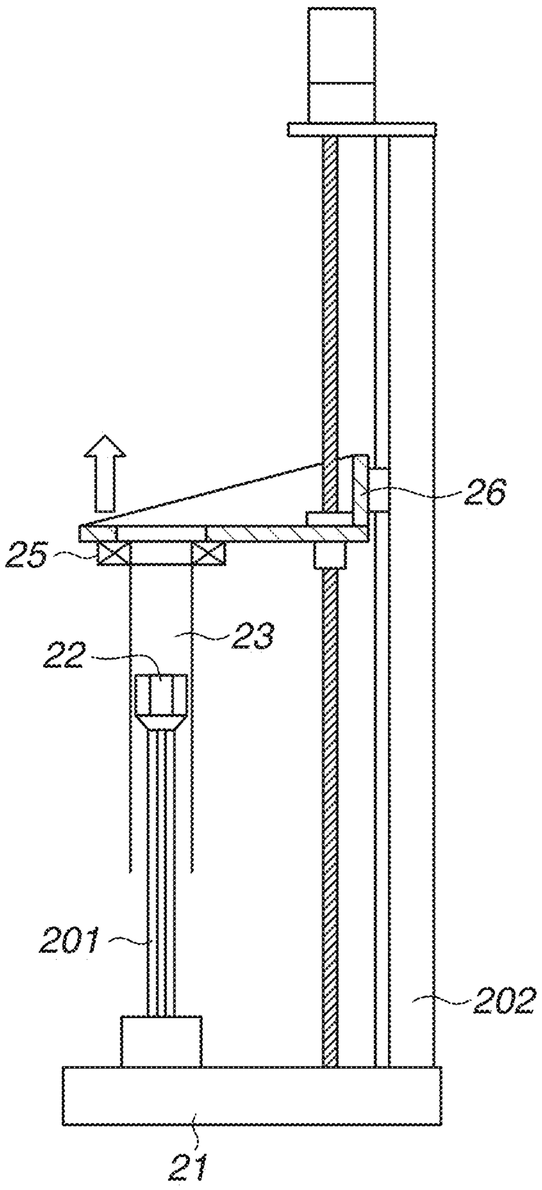
FIG. 4 is a schematic view of a coating apparatus used when an inner surface sliding layer is coated according to the present exemplary embodiment.

FIG. 4 is a schematic view of a coating apparatus using the ring-coating method. Supports 201 and 202 are formed on a base 21. A coating head 22 is fixed to the support 201, and a coating liquid supply device (not illustrated) is connected to the coating head 22.

A work moving device 26 on which a work hand 25 holding the cylindrical base member 1_c_ is formed is provided on the support 202. The work moving device 26 can be moved upward or downward by a motor provided on the support 202, and the work hand 25 formed on the work moving device 26 can also be moved upward or downward by the movement of the work moving device 26.

A slit portion (not illustrated) orthogonal to a circular cylinder axis is formed at an outer periphery of the coating head 22. The polyimide precursor solution 23 uniformly blended with the filler 1_a_ is supplied from the slit portion, the cylindrical base member 1_c_ is moved along the outer periphery of the coating head 22, and the coating of the inner surface of the cylindrical base member 1_c_ is thereby performed. In the coating apparatus, the thickness of the inner surface sliding layer 1_b_ is determined depending on the coating amount. Changing a clearance, a supply speed of the polyimide precursor solution 23, and a moving speed of the work moving device 26 enables obtaining a desired coating amount.

After the polyimide precursor solution 23 blended with the filler 1_a_ is applied to the inner surface of the cylindrical base member 1_c_, the organic polar solvent contained in the polyimide precursor solution 23 is evaporated by heating, and viscosity of the polyimide precursor solution 23 is increased by the evaporation to maintain a shape of the polyimide precursor solution 23.

Figure 5:
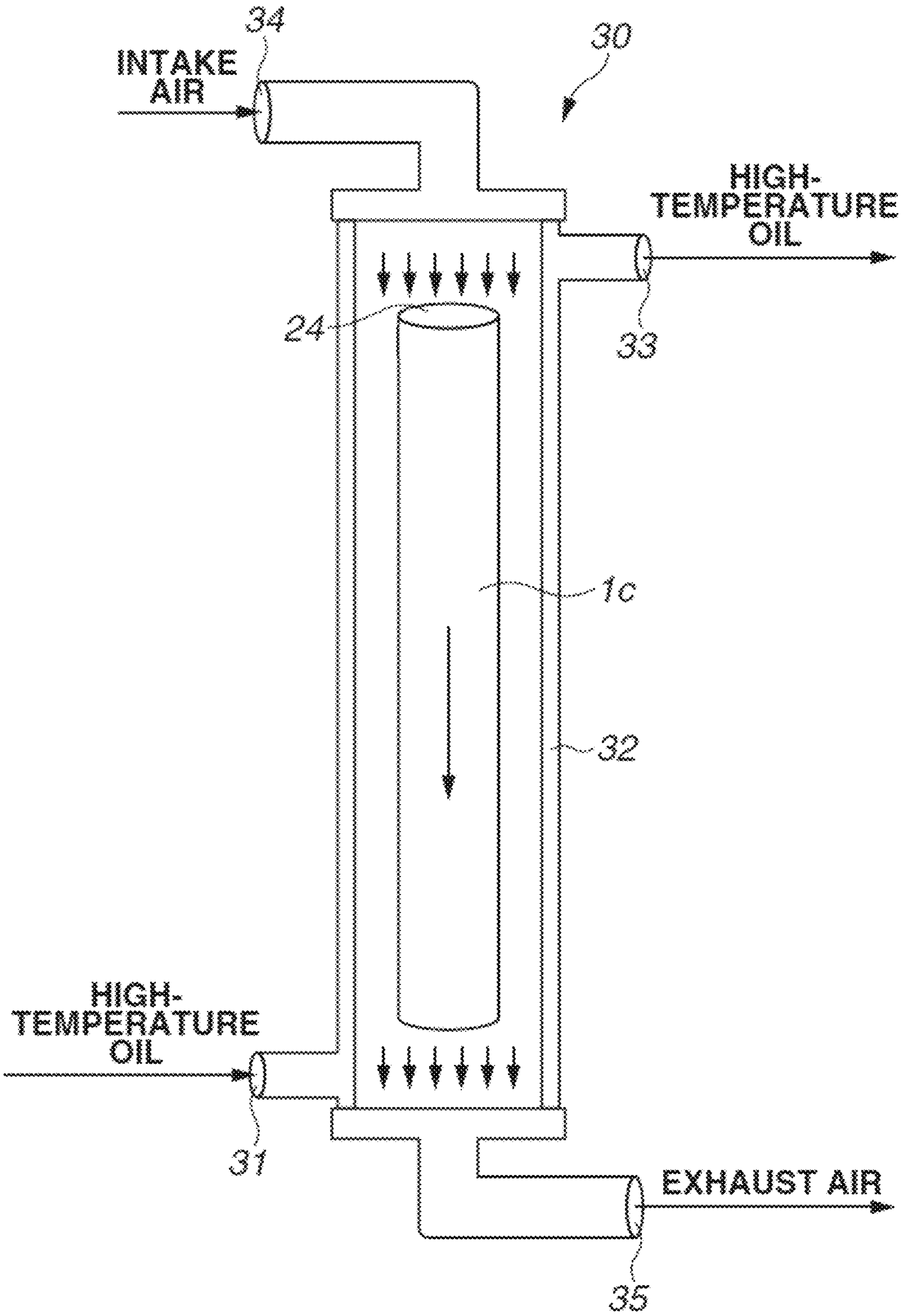
FIG. 5 is a cross-sectional view of a drying apparatus used when the inner surface sliding layer is dried according to the present exemplary embodiment.

For example, as illustrated in FIG. 5, the filler dispersion solution 24 (having the polyimide precursor solution 23 and the filler 1_a_) applied to the inner surface of the cylindrical base member 1_c_ is put into a heat drying furnace 30 for about 300 seconds. In the heat drying furnace 30, high-temperature oil at a temperature of 160° C. is put into an oil inlet 31, passes through a heating cylinder 32, and is discharged from an oil outlet 33. The organic polar solvent contained in the polyimide precursor solution 23 is volatilized and reduced from about 90% by volume to less than about 30% by volume, whereby the viscosity of the polyimide precursor solution 23 applied to the inner surface of the cylindrical base member 1_c_ is increased and leakage of the polyimide precursor solution 23 from the inner surface of the cylindrical base member 1_c_ is prevented. In the present exemplary embodiment, the viscosity of the polyimide precursor solution 23 is increased by the reduction of the organic polar solvent to 20% by volume.

When the organic polar solvent is evaporated, ventilation is to be performed to maintain the organic polar solvent at less than a lower explosive limit. The ventilation is performed in such a manner that the air is supplied from an intake port 34 illustrated in FIG. 5, passes through the cylindrical base member 1_c_ to pick up evaporated organic polar solvent, and is discharged from an exhaust port 35.

After the organic polar solvent is reduced to less than about 30% by volume, the cylindrical base member 1_c_ is left and dried in a hot air circulating furnace, for example, at a temperature of 200° C. for 30 minutes, and is then left and burned in a hot air circulating furnace at a temperature from 300 to 400° C., which is a temperature range that does not decrease fatigue strength of the cylindrical base member 1_c_, for 20 to 120 minutes. As a result of the heating, drying, and burning process, the inner surface sliding layer 1_b_ can be formed of the polyimide resin into which the filler 1_a_ was dispersed by a dehydrative ring-closing reaction.

(3-3) Silicone Rubber Elastic Layer 1_d_

The silicone rubber elastic layer 1_d_ functions as an elastic layer that is borne by a fixing member in order to apply uniform pressure to a toner image and an uneven surface of paper at the time of fixing. To implement such a function, addition reaction cross-linking type liquid silicone rubber is desirably used as the material of the silicone rubber elastic layer 1_d_ because of easiness in work, workability with high dimension accuracy, non-occurrence of a reaction by-product at the time of heat curing, and the like. This is also because adjustment of a degree of cross-linking based on a type or an addition amount of the filler 1_a_, which will be described below, enables adjustment of elasticity.

Generally, the addition reaction cross-linking type liquid silicone rubber contains (i) organopolysiloxane having an unsaturated aliphatic group, (ii) organopolysiloxane having active hydrogen bonded to silicon, and (ii) a platinum compound as a cross-linking catalyst.

Organopolysiloxane having active hydrogen bonded to silicon forms a cross-linking structure by reaction with an alkenyl group of the organopolysiloxane component having the unsaturated aliphatic group using catalyst action of the platinum compound.

The silicone rubber elastic layer 1_d_ may contain a filler in order to increase heat conductivity, strength, heat resistance, and the like of the fixing belt 1.

Especially, to increase the heat conductivity, it is desirable that the filler should have high heat conductivity. More specifically, examples of such a filler include an inorganic material, particularly, a metal or a metallic compound.

Specific examples of the material of the highly heat-conductive filler include silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), and nickel (Ni).

These materials can be used independently or two or more types thereof can be used in combination. An average particle diameter of the highly heat-conductive filler is desirably 1 μm or more or 50 μm or less in terms of handling and dispersibility.

As a shape of the highly heat-conductive filler, for example, a spherical shape, a pulverized shape, a plate-like shape, or a whisker shape is used, but the spherical shape is desirable in terms of dispersibility.

A desirable thickness range of the silicone rubber elastic layer 1*d* is 100 μm or more and 500 μm or less, more desirably 200 μm or more and 400 μm or less in terms of contribution to surface hardness of the fixing belt 1 and efficiency in heat conductivity to unfixed toner at the time of fixing.

In the present exemplary embodiment, alumina is used as the highly heat-conductive filler, the heat conductivity of the silicone rubber elastic layer 1*d* is 1.0 W/mK, and the thickness of the highly heat-conductive filler is 300 μm.

(3-4) Fluororesin Separation Layer 1*e*

As the fluororesin separation layer 1*e*, for example, a resin, such as a tetrafluoroethylene perfluoro (alkyl vinyl ether) copolymer (PFA), polytetrafluoroethylene (PTFE), and a tetrafluoroethylene-hexafluoropropylene copolymer (FEP), formed into a tube shape is used. Among the above-mentioned materials, PFA is desirably used in terms of formability and toner separability.

A thickness of the fluororesin separation layer 1*e* is desirably 50 μm or less. This is because it is possible to maintain elasticity of the silicone rubber elastic layer 1*d*, which is a lower layer, at the time of lamination, and prevent the surface hardness of the fixing member from becoming too high.

Preliminarily subjecting the inner surface of the fluororesin tube to sodium treatment, excimer laser treatment, ammonia treatment, or the like can increase adhesion.

In the present exemplary embodiment, the PFA tube having a thickness of 20 μm that is obtained by extrusion molding is used as the fluororesin separation layer 1*e*. The inner surface of the PFA tube is subjected to ammonia treatment to improve wettability with an adhesive (described below).

The silicone rubber adhesive layer that fixes the PFA tube as the fluororesin separation layer 1*e* to the silicone rubber elastic layer 1*d* is formed of a cured material of an addition curing silicone rubber adhesive applied to the surface of the silicone rubber elastic layer 1*d*. The addition curing silicone rubber adhesive contains addition curing silicone rubber blended with a self-adhesive component represented by silane containing a functional group such as an acryloxy group, a hydrosilyl group (SiH group), an epoxy group, or an alkoxysilyl group.

Subsequently, the addition curing silicone rubber adhesive is heated using a heating device, such as an electric furnace, for a predetermined time to be cured and adhered, and each end thereof is cut to a desired length, so that the fixing belt 1 as the fixing member according to the present exemplary embodiment can be obtained.

In the present exemplary embodiment, fluorine phlogopite having an aspect ratio of 50 (an average particle diameter of 6 μm and a particle thickness of 100 nm) serving as the scale-like filler 1*a* is blended into the polyimide precursor solution 23 "U-Varnish-S" (manufactured by UBE Corporation) which uses 3,3',4,4'-biphenyltetracarboxylic dianhydride as aromatic tetracarboxylic dianhydride and paraphenylenediamine as aromatic diamine so that the volume of the filler 1*a* is 7% by volume with respect to the whole volume of the solid content to be formed as the inner surface sliding layer 1*b*. The filler dispersion solution 24 is prepared by directly adding the scale-like filler 1*a* (fluorine phlogopite) in the polyimide precursor solution 23 ("U-Varnish-S"), preliminarily stirring the polyimide precursor solution 23 using a mixer, and then dispersing the scale-like filler 1*a* into the polyimide precursor solution 23 using a three-roll mill.

The inner surface of the cylindrical base member 1*c* is coated with the polyimide precursor solution 23 into which the filler 1*a* is dispersed, using the ring-coating method so that the coating thickness is 77 μm.

After the coating, the coated film is heat-dried in the heat drying furnace 30 in which the temperature of the high-temperature oil is set to 160° C.

Subsequently, the cylindrical base member 1*c* is left and dried in the hot air circulating furnace at a temperature of 200° C. for 30 minutes, and is then left and burned in another hot air circulating furnace at a temperature of 400° C. for 30 minutes to form the inner surface sliding layer 1*b*.

The thickness of the inner surface sliding layer 1*b* formed on the inner surface of the cylindrical base member 1*c* is 12 μm.

The surface of the cylindrical base member 1*c* is coated with the hydrosilyl group silicon primer "DY39-051 A/B" (manufactured by Dow Corning Toray Co., Ltd.) and is heat-cured at a temperature of 200° C. for five minutes. The outer circumferential surface thereof is coated with addition reaction cross-linking type liquid silicone rubber with a thickness of 300 μm, and is heat-cured at a temperature of 200° C. for 30 minutes to form the silicone rubber elastic layer 1*d*. Furthermore, the outer circumferential surface thereof is covered with the PDF tube having a thickness of 20 μm as the fluororesin separation layer 1*e* via the silicon adhesive "SE1819 CV A/B" (manufactured by Dow Corning Toray Co., Ltd.) and is heat-cured at a temperature of 200° C. for two minutes.

A comparative example of the present exemplary embodiment will be described. In the present comparative example, the fixing belt 1 is made similarly to the present exemplary embodiment except that the fluorine phlogopite, having the aspect ratio of 50 (an average particle diameter of 6 μm and a particle thickness of 100 nm) and serving as the scale-like filler 1*a* is changed to the one having an aspect ratio of 80 (an average particle diameter of 8 μm and a particle thickness of 100 nm) and blended.

[Filler 1*a* Distribution in Inner Surface Sliding Layer 1*b*]

Regarding the distribution of the scale-like filler 1*a* blended into the inner surface sliding layer 1*b*, a cross section of the inner surface sliding layer 1*b* is obtained by cutting the inner surface sliding layer 1*b* along a thickness direction thereof serving as a vertical axis and is divided into a plurality of sections each having a width the same as the thickness thereof in a direction orthogonal to the thickness direction. In the present exemplary embodiment, the cross section of the inner surface sliding layer 1*b* is divided into 20 or more sections. In a case where an area ratio of the scale-like filler 1*a* in each of the sections is converted into numbers, a period coefficient is calculated using the formula (Ave %−Min %)/Ave %, where an average of the area ratios of the scale-like filler 1*a* in all the sections is Ave % and a minimum of the area ratios is Min %.

It is assumed that, in each of the sections, the whole area of the cross section portion of the inner surface sliding layer 1*b* is 100% and a ratio of an area of the cross section portion of the scale-like filler 1*a* to the whole area is the area ratio.

Figure 6A:
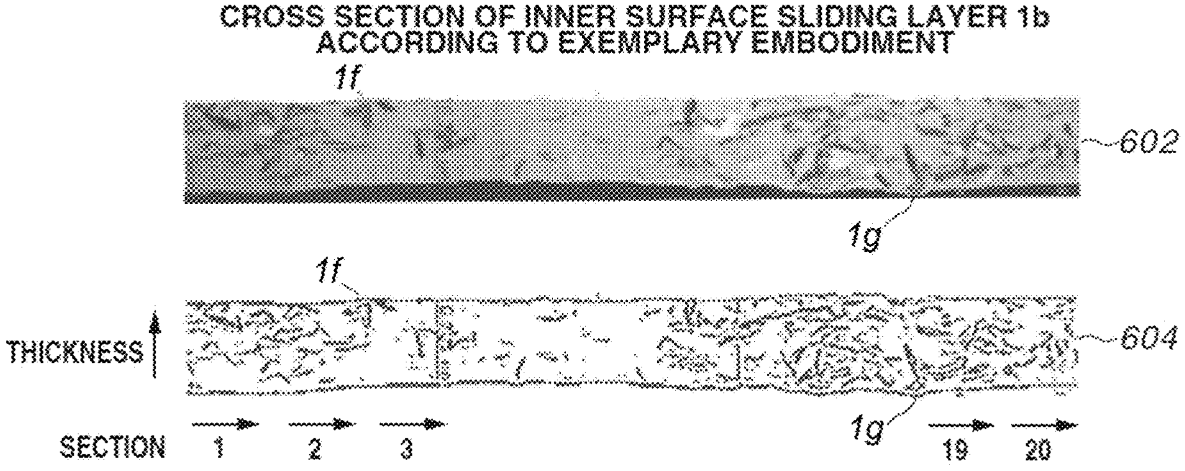
FIG. 6A is a cross-sectional view of the inner surface sliding layer according to the present exemplary embodiment.
Figure 6B:
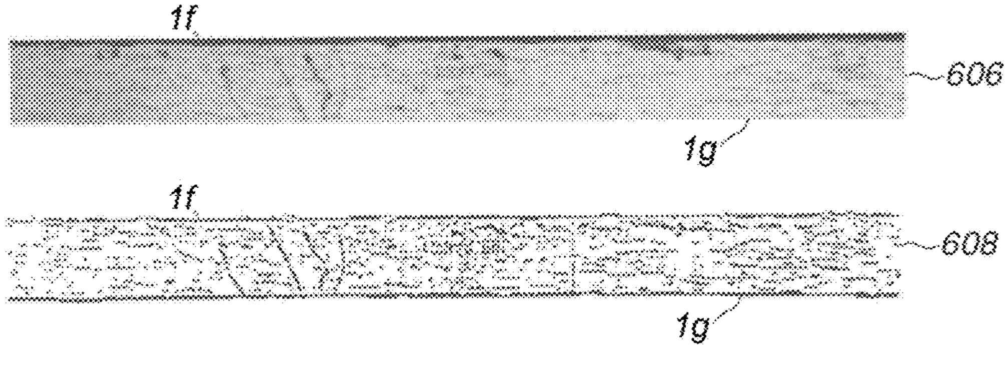
FIG. 6B is a cross-sectional view of an inner surface sliding layer according to a comparative example.

In the present exemplary embodiment, the fixing belt 1 is cut in a rotational direction (a circumferential direction), sectional milling is performed on the inner surface sliding layer 1*b* of the cut surface using the ion milling apparatus ("IM4000PLUS" manufactured by Hitachi High-Technologies Corporation) and then observation and image processing is performed on the cross section using a scanning electron microscope (SEM), so that the numerical conversion is performed. FIGS. 6A and 6B are cross-sectional views each illustrating the inner surface sliding layer 1*b*. More specifically, the upper portion of FIG. 6A illustrates an optical observation image 602 according to the present exemplary embodiment, and the lower portion of FIG. 6A illustrates an image obtained by binarizing the optical observation image 604 (binary image 604) according to the present exemplary embodiment. The upper portion of FIG. 6B illustrates an optical observation image 606 according to the comparative example, and the lower portion of FIG. 6B illustrates an image obtained by binarizing the optical observation image 608 (binary image 608) according to the comparative example.

Figures 7A, 7B:
FIG. 7A is a cross-sectional view illustrating the divided inner surface sliding layer of the fixing belt according to the present exemplary embodiment.
FIG. 7B is a table illustrating area ratios of a filler according to the present exemplary embodiment.
Figure 7C:
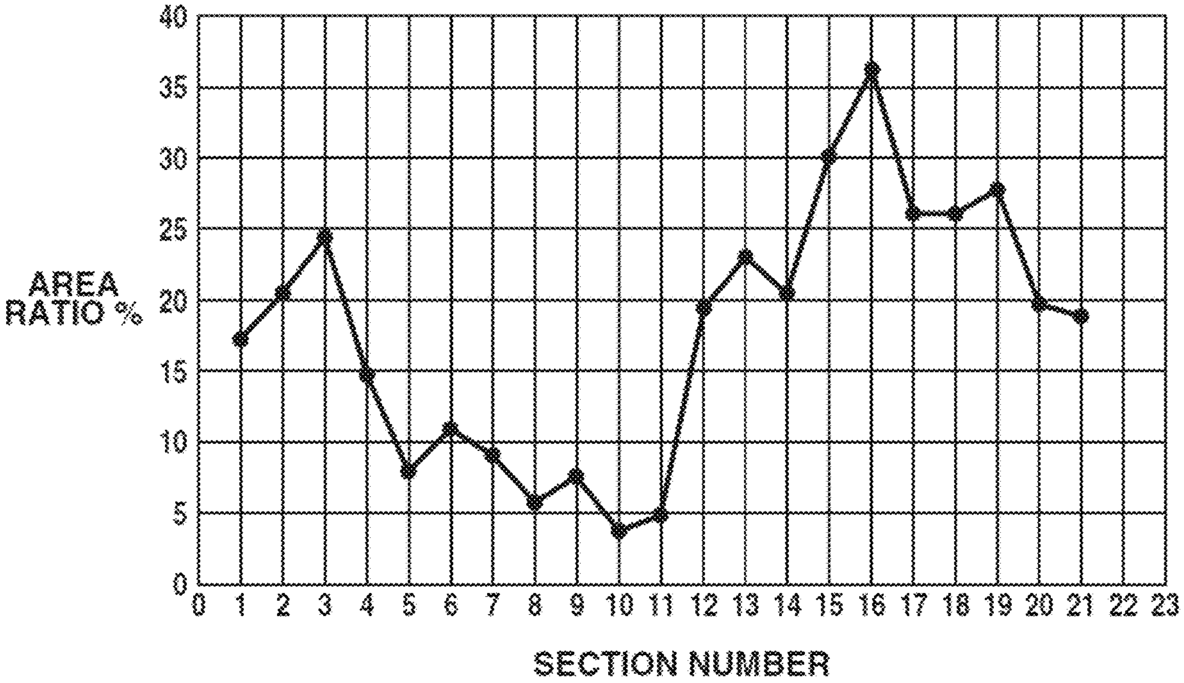
FIG. 7C is a graph illustrating the area ratios according to the present exemplary embodiment.

FIG. 7A is the binary image 604 of the cross section of the inner surface sliding layer 1*b* according to the present exemplary embodiment that is divided into sections each having the same width as the thickness in a plane direction, using image analysis software "ImageJ". FIG. 7B illustrates calculation results of the respective area ratios in the sections and the period coefficient calculated using the formula (Ave %−Min %)/Ave % according to the present exemplary embodiment. FIG. 7C is a graph of the respective area ratios in the sections according to the present exemplary embodiment.

Figures 8A, 8B:
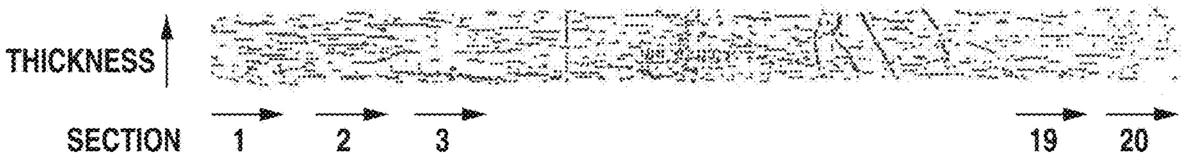
FIG. 8A is a cross-sectional view illustrating the divided inner surface sliding layer of a fixing belt according to the comparative example.
FIG. 8B is a table illustrating area ratios of a filler according to the comparative example.
Figure 8C:
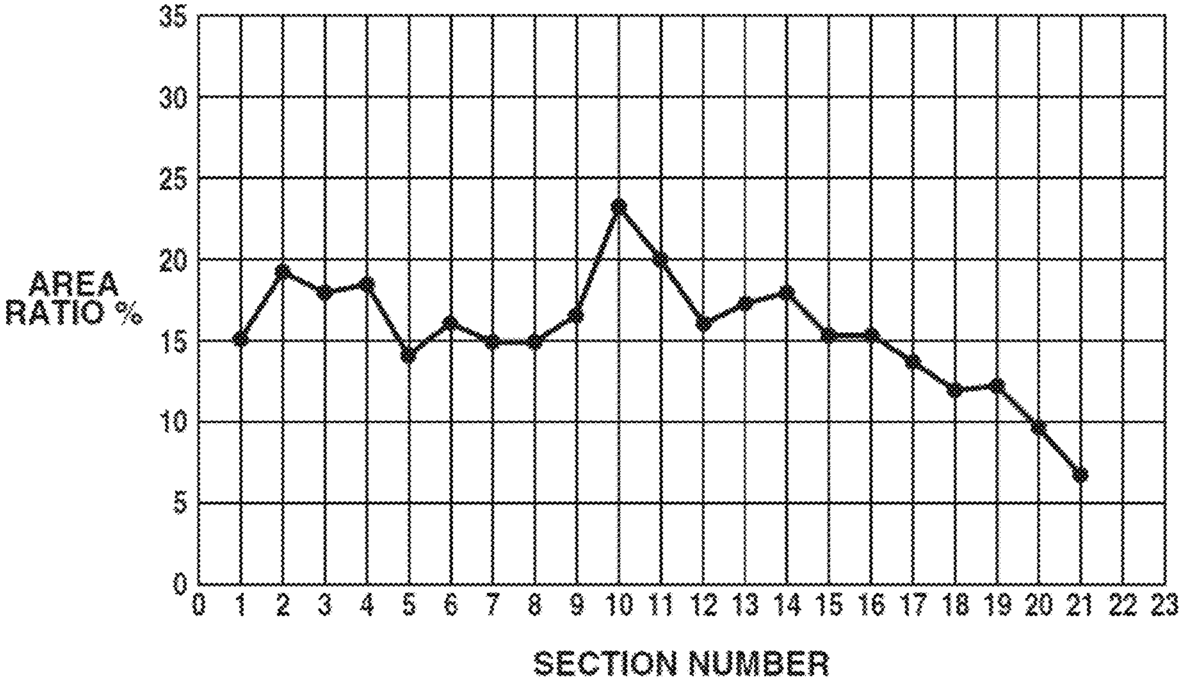
FIG. 8C is a graph illustrating the area ratios according to the comparative example.

FIG. 8A is the binary image of the cross section of the inner surface sliding layer 1*b* according to the comparative example that is divided into sections each having the same width as the thickness in a similar manner. FIG. 8B illustrates calculation results of the respective area ratios in the sections and the period coefficient calculated using the formula (Ave %−Min %)/Ave % according to the comparative example. FIG. 8C is a graph of the respective area ratios in the sections according to the comparative example.

[Roughness of Inner Circumferential Surface of Inner Surface Sliding Layer 1*b*]

FIG. 9 is a table summarizing the film thickness, period coefficient, and surface roughness according to each of the present exemplary embodiment and the comparative example. As the surface roughness on the inner circumferential surface side of the inner surface sliding layer 1*b*, arithmetic average roughness Ra (unit: μm) according to JIS B0601 is measured using a surface roughness measurement instrument ("Surfcorder" manufactured by Kosaka Laboratory Ltd.) with an evaluation length of 4 mm, a cut-off value of 0.8 mm, and a feed rate of 0.1 mm/s as measurement conditions.

According to the present exemplary embodiment and the comparative example, for example, use of fillers for the filler 1*a* different in aspect ratio and average particle diameter enables formation of sliding films different in period coefficient and change of surface roughness. Although a mechanism thereof has yet to be clarified accurately, it is presumed that, regarding the convection flow of the applied liquid generated in the coating film drying process at the time of film formation, there is case where the filler moves into the convection flow and there is a case where the orientations of the particles change along the convection flow because of filler characteristics.

The configuration according to the present exemplary embodiment makes it possible to increase the surface roughness of the inner surface sliding layer 1*b* even with the same amount of filler 1*a*, thereby effectively adding roughness on the sliding surface side (the inner circumferential surface side). Furthermore, the configuration makes it possible to increase wear resistance in the fixing belt rotational direction (refer to FIG. 2), thereby providing the fixing belt 1 including the inner surface sliding layer 1*b* capable of preventing torque-up and stick slip over the durable life.

The exemplary embodiment of the present disclosure makes it possible to provide a cylindrical fixing belt Lin which at least three layers, an inner surface sliding layer 1*b*, a metal base member 1*c*, and a separation layer 1*e* are arranged in order from the inner side, and the inner surface sliding layer 1*b* has slidability, wear resistance, and a lubricant retention ability and is capable of preventing torque-up and stick slip.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-123506, filed Jul. 28, 2021, which is hereby incorporated by reference herein in its entirety.

What is claimed is:

1. A fixing belt comprising:

a base member having a cylindrical shape and containing a metal;

a sliding layer formed on an inner circumferential surface side of the base member and containing a filler; and a separation layer formed on an outer circumferential surface side of the base member, wherein, assume that (i) a cross section of the sliding layer is obtained by cutting the sliding layer along a thickness direction of the sliding layer serving as a vertical axis and is divided into a plurality of sections each having a width whose value is the same as a value of a thickness of the sliding layer in a direction perpendicular to the thickness direction, and (ii) a ratio of an area of the filler to an area of the sliding layer in each of the plurality of sections of the cross section is an area ratio, wherein a period coefficient is calculated using the formula (Ave %−Min %)/Ave %, where an average of area ratios of areas of the filler in all sections of the plurality of sections is Ave % and a minimum of the area ratios is Min %, and wherein a value of the calculated period coefficient is 0.6 or more.

2. The fixing belt according to claim 1, wherein an inner circumferential surface of the sliding layer is configured to rotate while being in sliding contact with a back-up member.

3. The fixing belt according to claim 2, wherein the back-up member is a planar heating element.

4. The fixing belt according to claim 1, wherein the sliding layer has a thickness of 5 to 25 micrometers (μm), and wherein the filler has an average particle diameter of 1 μm or more and 20 μm or less, and an aspect ratio of the filler is 5 or more and 50 or less.

5. The fixing belt according to claim 1, wherein the sliding layer is a thermosetting resin that contains 20 to 95% of a solvent before being cured by heat, and the sliding layer is formed through a drying process for volatilizing the solvent.

6. A fixing belt comprising:

a base member having a cylindrical shape and containing a metal;

a sliding layer having an inner circumferential surface as a sliding surface side, having an outer circumferential surface formed on an inner circumferential surface side of the base member, and containing a filler, wherein the outer circumferential surface to the inner circumferential surface form a thickness in a thickness direction; and a separation layer formed outside an outer circumferential surface side of the base member, wherein the sliding layer is a thermosetting resin that contains 20 to 95% by volume of a solvent in a precursor solution before being cured by heat, the sliding layer is formed through a drying process for volatilizing the solvent, and a shape of the precursor solution is maintained by an increase a viscosity of the precursor solution from a predetermined reduction in the volume of the solvent after the solvent is cured by heat.

7. The fixing belt according to claim 6, wherein an inner circumferential surface of the sliding layer is configured to rotate while being in sliding contact with a back-up member.

8. The fixing belt according to claim 7, wherein the back-up member is a planar heating element.

9. The fixing belt according to claim 6, wherein the sliding layer has a thickness of 5 to 25 micrometers (μm), and wherein the filler has an average particle diameter of 1 μm or more and 20 μm or less, and an aspect ratio of the filler is 5 or more and 50 or less.

10. The fixing belt according to claim 6, wherein, assume that (i) a cross section of the sliding layer is obtained by cutting the sliding layer along the thickness direction of the sliding layer serving as a vertical axis and is divided into a plurality of sections each having a width whose value is the same as a value of the thickness of the sliding layer in a direction perpendicular to the thickness direction, and (ii) a ratio of an area of the filler to an area of the sliding layer in each of the plurality of sections of the cross section is an area ratio, wherein a period coefficient is calculated using a formula (Ave %−Min %)/Ave %, where an average of area ratios of areas of the filler in all sections of the plurality of sections is Ave % and a minimum of the area ratios is Min %, and wherein a value of the calculated period coefficient is 0.6 or more.

11. The fixing belt according to claim 6, wherein the precursor solution is a polyimide precursor solution and the solvent is an organic polar solvent contained in the polyimide precursor solution and, after being cured by heat, the organic polar solvent is reduced to a volume that prevents leakage of the polyimide precursor solution from the inner circumferential surface side of the base member by increasing the viscosity of the polyimide precursor solution.

12. The fixing belt according to claim 11, wherein the viscosity of the polyimide precursor solution is increased by the predetermined reduction of the organic polar solvent to 20% by volume.

13. The fixing belt according to claim 6, wherein, in a case where the filler has a first aspect ratio and a first average particle diameter, the sliding surface side of the sliding layer has a first surface roughness, and wherein the filler has a second surface roughness that is at least one and half times greater than the first surface roughness as a result of having a second aspect ratio that is less than the first aspect ratio and has a second average particle diameter that is less than the first average particle diameter.

14. The fixing belt according to claim 6, further comprising an elastic layer between the base member and the separation layer.

* * * * *